UNITED STATES PATENT OFFICE.

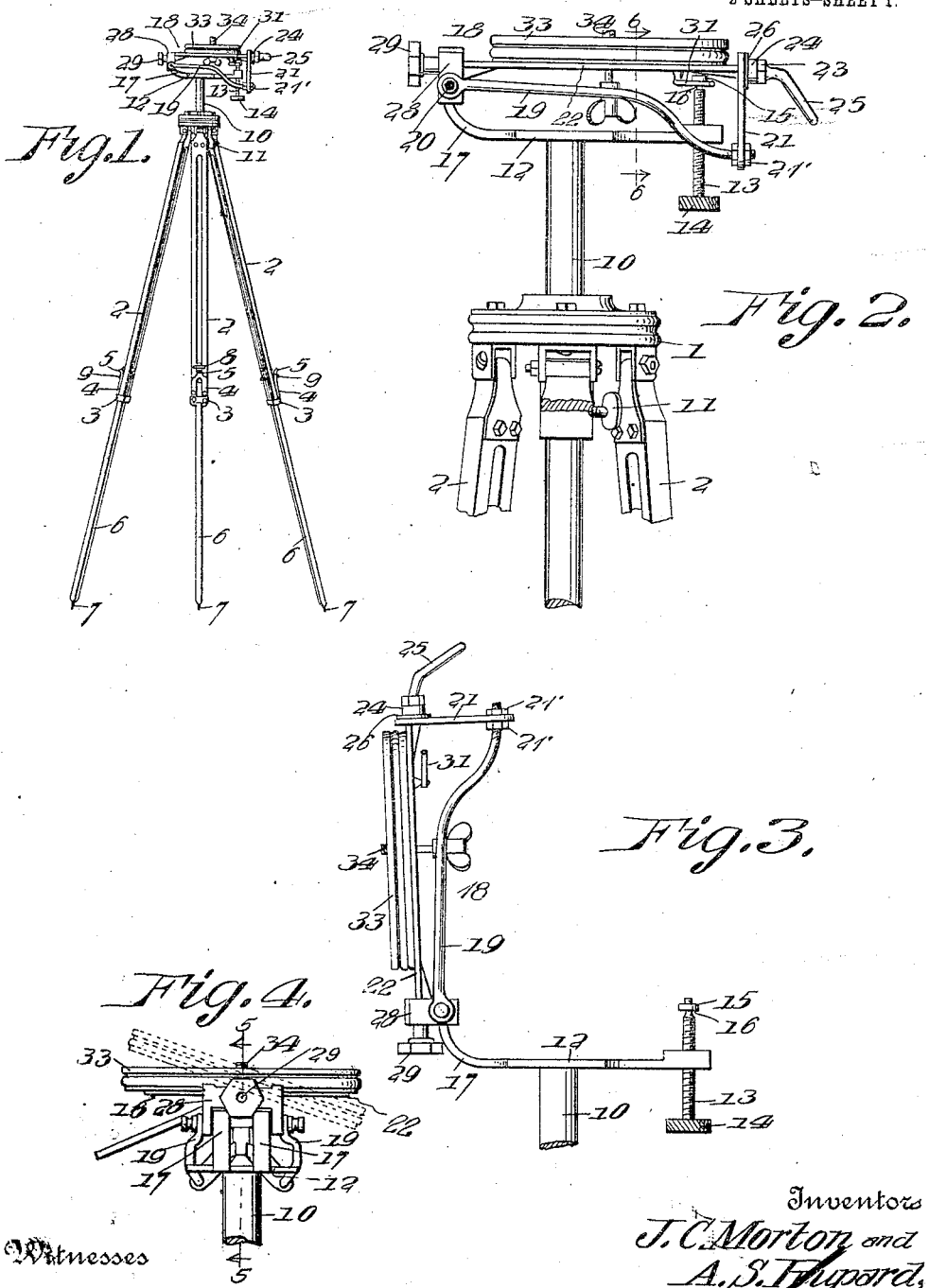

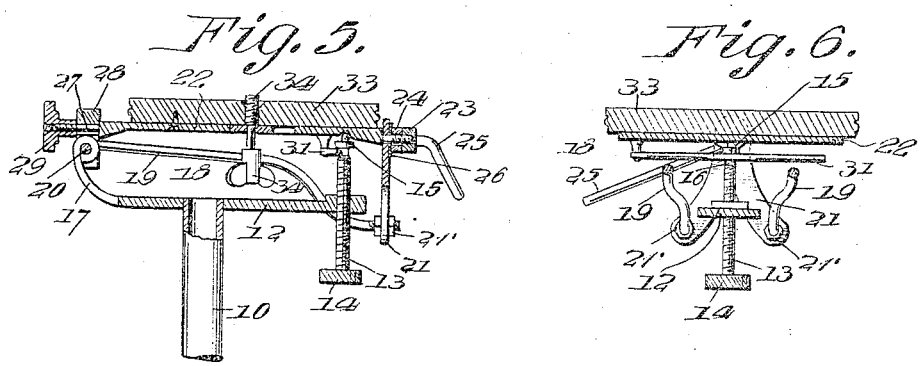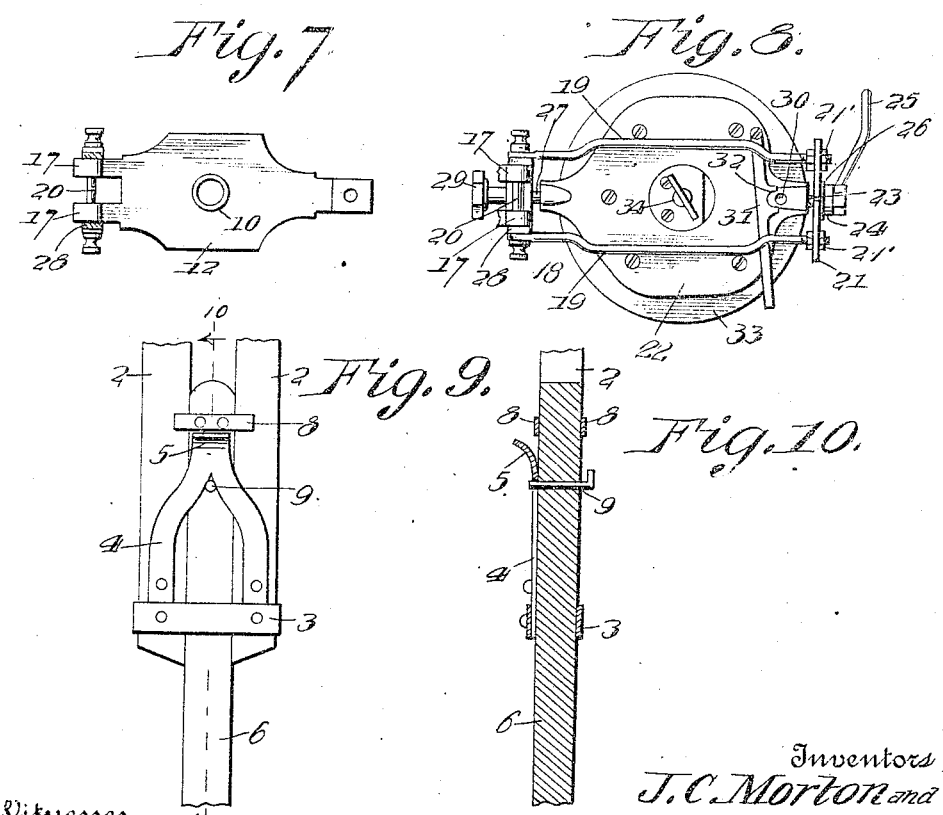

JOSEPH C. MORTON AND ALBERT S. RUPARD, OF ELDORADO SPRINGS, MISSOURI.

TRIPOD.

1,061,102.

Specification of Letters Patent.

Patented May 6, 1913.

Application filed May 6, 1912. Serial No. 695,549.

*To all whom it may concern:*

Be it known that we, JOSEPH C. MORTON and ALBERT S. RUPARD, citizens of the United States, residing at Eldorado Springs, in the county of Cedar and State of Missouri, have invented certain new and useful Improvements in Tripods; and we do declare the following to be a full, clear, and exact description of the invention, such as will enable others skilled in the art to which it appertains to make and use the same.

This invention relates to improvements in tripods, and particularly to tripods for supporting cameras.

One object of the invention is to provide a tripod having a camera attaching means capable of being adjusted vertically, and of being tilted longitudinally and laterally, whereby the camera may be readily brought to the desired position without disturbing the tripod legs after they have been set up.

Another object is to provide an adjustable attaching mechanism for tripods which will be simple, strong, durable and inexpensive in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings; Figure 1 is a side view of a tripod constructed in accordance with our invention; Fig. 2 is an enlarged side view of the head and adjustable attaching mechanism of the tripod showing the latter in operative position; Fig. 3 is a similar view showing the hinge member of the attaching mechanism swung upwardly, to permit the same to be fastened to a tripod. Fig. 4 is an end view of the inner or rear end of the attaching mechanism; Fig. 5 is a central vertical longitudinal section taken on the line 5—5 of Fig. 4; Fig. 6 is a similar view taken at right angles to Fig. 5 and on the line 6—6 of Fig. 2; Fig. 7 is a top plan view of the lower section of the attaching mechanism; Fig. 8 is an inverted plan view of the upper section of the attaching mechanism; Fig. 9 is an enlarged outer side view of the outer end of the upper member of one of the tripod legs and the inner end of the lower member showing the means for holding said leg members in extended position; Fig. 10 is a longitudinal sectional view thereof on the line 10—10 of Fig. 9.

Referring more particularly to the drawings, 1 denotes the head of our improved tripod. To said head are hingedly connected the upper members 2 of the tripod legs, said members being bifurcated to provide parallel bars which are connected together at their outer ends by inner and outer clips 3 and have arranged on said outer ends substantially V-shaped spring catches 4 having outwardly turned inner ends which form thumb pieces 5 for releasing said catches. Slidably engaged between the bars of the inner members 2 of the legs are outer leg members 6 having in their outer ends the usual pins 7 to prevent the slipping of the legs and having on the inner and outer sides of their upper ends guide plates 8 which engage the inner and outer sides of the inner members of the legs as shown. In the outer sides of the inner ends of the outer members 6 of the leg are short outwardly projecting studs 9 which, when the outer sections 6 of the legs are drawn outwardly to their greatest extent pass beneath the inner ends of the catches 4 which spring over the studs and thereby prevent the casual closing or inward movement of the outer sections of the tripod legs.

Slidably engaged with the head 1 and with a collar secured to the lower side of the head is a tubular supporting post 10 which is secured in its adjustable positions in the head and sleeve by a set screw 11. Rigidly fastened to the upper end of the post 10 is the lower plate 12 of a camera attaching mechanism. On the rear end of the plate 12 is a reduced extension which is of somewhat greater thickness than the plate 12 and has therein a vertically disposed threaded passage with which is engaged a combined adjusting and fastening screw 13 having on its lower end a milled head 14 and on its upper end an annular enlargement 15, immediately below which is formed an annular groove 16. The purpose of the screw 13 will be hereinafter more fully described. On the forward end of the plate 12 is a pair of upwardly turned apertured pivot lugs 17 which form one member of the hinge connection of an upper camera attaching member 18.

The upper camera attaching member comprises a pair of parallel rods 19 having their forward ends curved inwardly and provided with apertures to receive a pivot pin 20 which also pivotally engages the apertured pivot lug 17 on the plate 12. The rear ends of the rods 19 curve downwardly on opposite sides of the rear end of the plate 12 and said ends are threaded and engaged with a substantially triangular bracket 21. The bracket 21 is securely fastened to the threaded ends of the rods 19 by clamping nuts 21' which are screwed onto said ends of the rods and engage the opposite sides of the adjacent parts of the bracket as shown.

Arranged above the rods 19 and spaced a suitable distance therefrom is an upper camera attaching plate 22 on the inner end of which is secured a rearwardly projecting stud bolt 23 which is pivotally engaged with an aperture in the upper end of the bracket 21 and has loosely mounted thereon adjacent to the outer side of the bracket, a bracket clamping washer 24 which is adapted to be clamped into rigid engagement with the outer side of the bracket by a clamping lever 25 having in its inner end a threaded passage to receive the stud bolt 23. On the bolt between the inner side of the washer 24 and the outer side of the bracket is preferably arranged a wear plate or washer 26. On the forward end of the plate 22 is secured a forwardly projecting stud bolt 27, which is pivotally engaged with a yoke shaped plate supporting member 28 the depending ends of which are pivotally engaged with the pivot bolt 20 in the apertured lugs of the attaching plate 12. The outer end of the stud bolt projects a short distance beyond the yoke shaped member 28 and on said projecting end of the bolt is screwed a clamping nut 29. In the lower side of the rear end of the plate 22 is a socket or recess 30 with which is engaged the upper end of the adjusting screw 13 in the rear end of the lower attaching plate 12. Pivotally secured at one end to a depending stud on the lower side of the rear end of the plate 22 is a locking lever 31 having in one side a notch or recess 32 which is adapted to be engaged with the annular groove 16 in the upper end of the screw 13 whereby the upper attaching plate 22 and the parts attached thereby are fastened to the screw and thereby held in a lowered position. Secured to the upper side of the upper attaching plate 22 is a camera supporting block or base plate 33 in the center of which is secured the usual swiveled camera attaching screw 34 by means of which the body or frame of the camera is securely fastened to the plate 33.

By providing an attaching mechanism constructed as herein shown and described, it will be seen that the camera when connected therewith may be readily tilted forwardly, rearwardly, or laterally in either direction and to the desired angle or inclination without interfering with the legs of the tripod after they have been set up in position.

When it is desired to adjust the camera attaching mechanism laterally the locking lever 31 is released from its engagement with the screw 13 and said mechanism temporarily held in the desired position by the means before described. It is understood, however, in this connection that when no lateral adjustment of the camera is required the longitudinal movement of the same is absolutely prevented by the interlocking engagement of the lever 31 and screw 13 previously referred to, whereby a rigid construction is obtained under ordinary application of the invention and constructive parts thereof. It will also be seen that the camera may be readily raised or lowered to the desired height on the tripod by means of the supporting post and set screw arranged in the head of the tripod as shown.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described our invention, what we claim is;

In a device of the character described, a camera attaching mechanism mounted upon supporting legs, said mechanism comprising a fixed and a movable member, the latter being capable of adjustment, parallel rods carried by the movable member having their forward ends pivoted to the stationary member, a bracket secured to the rear ends of said rods and projecting upwardly therefrom, a camera attaching plate forming a part of the movable member, a projecting threaded bolt forming a part of said plate and passing loosely through the bracket, a clamping lever mounted upon said bolt for holding the movable member rigidly to the bracket, an adjusting screw mounted in the fixed member, the upper end of which is in detachable contact with the plate of the movable member, and a lever carried by said plate and adapted for interlocking engagement with an annular groove formed in the adjusting screw for the purpose described.

In testimony whereof we have hereunto set our hands in presence of two subscribing witnesses.

JOSEPH C. MORTON.
ALBERT S. RUPARD.

Witnesses:
W. O. ELLISTON,
O. P. CASSITY.